(No Model.)

J. D. GIBBS.
CASH FARE TICKET FOR RAILROADS.

No. 453,442. Patented June 2, 1891.

WITNESSES.
F. McArdle
C. Sedgwick

INVENTOR:
J. D. Gibbs
BY Munn & Co.
ATTORNEYS

UNITED STATES PATENT OFFICE.

JAMES D. GIBBS, OF JEFFERSONVILLE, INDIANA.

CASH-FARE TICKET FOR RAILROADS.

SPECIFICATION forming part of Letters Patent No. 453,442, dated June 2, 1891.

Application filed December 3, 1889. Serial No. 332,375. (No model.)

*To all whom it may concern:*

Be it known that I, JAMES D. GIBBS, of Jeffersonville, in the county of Clark and State of Indiana, have invented a new and useful Improvement in Cash-Fare Tickets for Railroads, of which the following is a full, clear, and exact description.

This invention relates to that class of railroad-tickets which are known as "conductors' cash-fare receipts," and in which the ticket as issued by the company to the conductor, and which is more especially designed for local or way fares for the accommodation of passengers, for instance, who have omitted to buy their tickets before entering the cars, is so made and printed or marked as to admit of the separation of it into two parts, the one of which when detached forms a separate ticket or coupon that is given as a receipt to the passenger for the fare paid by him and expresses upon the face of it the amount paid, while the remaining portion of the ticket that is retained by the conductor and also shows the amount of fare received is subsequently returned by him to the company as an acknowledgment of the amount received by him on the ticket and constitutes an auditor's check in settling up the accounts of the company. It is highly important in this class of tickets not only that the passenger's receipt portion of the ticket should clearly show the amount paid by him, and the remaining portion of the ticket also clearly indicate the same amount as received by the conductor, but that such tickets cannot be manipulated by the conductor so as to defraud the company, which, by improperly severing and punching, is not infrequently done; also that the severing of the ticket into its two parts, as required, can be accurately and quickly done by the conductor.

My invention, which has the above-named and other ends in view and gives to the ticket an iron-clad character so far as protection against improper manipulation is concerned, consists in a novel construction and arrangement of the parts of such a ticket, substantially as hereinafter described, and pointed out in the claims, and whereby a very perfect cash-fare receipt and auditor's check combined is produced.

Reference is to be had to the accompanying drawings, forming a part of this specification, in which similar letters of reference indicate corresponding parts in both figures.

Figure 1 represents a face view of a cash-fare-receipt ticket embodying my invention, and showing the cash-fare-receipt portion of the ticket as detached from the check portion thereof; and Fig. 2 is a face view of a modification of one portion of such a ticket adapted for short lines of railroad.

Prior to describing the invention it may here be remarked that the ticket may be made of various sizes, and so as to be restricted to different maximum amounts of local or conductor's fares, which usually do not exceed eight dollars and ninety-five cents, and may be less. In the ticket shown in Fig. 1, which I will now proceed to describe, the maximum amount of the ticket is eight dollars and ninety-five cents, or under ten dollars, and the cash-fare receipt as detached for the fare paid indicates three dollars and sixty-two cents.

In said Fig. 1, A indicates the check portion of the ticket to be retained by the conductor and returned to the company, and B the detached cash-fare-receipt portion to be given to the passenger.

Running longitudinally of the ticket are a series of dollar-spaces $b$, arranged one under the other, separated by lines or rows of perforations $c$, and divided transversely by a series of lines or rows of perforations $d$, which are extended outward to the upper edge of the ticket. The dollar-spaces $b$, as formed by the lines $c$, crossed at right angles by the lines $d$, contain a repetition of the same numerals in a longitudinal direction of the ticket—that is, the upper longitudinal row has a series of the numeral 1 between the lines or perforations $c$ and $d$, the next longitudinal row a like series of the numeral 2, and so on till the lower longitudinal row, which contains a series of the numeral 8 or whatever the maximum dollar amount of the ticket, is reached. Above these several longitudinal rows of dollar-spaces is a longitudinal row of cent-spaces $e$, arranged over the dollar numerals, running from right to left of the ticket and ranging, say, by successive amounts increasing by fives, from 0 to 90.

The upper portion of the ticket over the dollar and cent spaces *b* and *e*, where divided by the extension of the transverse lines or perforations *d* into spaces *f*, has boldly delineated on it in numerals and letters different cent amounts, ranging, by successive increases of fives from right to left, from five cents to ninety-five cents.

The numerals in the spaces or rows *b* and *e* may be printed in small figures, and to the right of the longitudinal dollar rows or spaces *b* are a series of spaces *g*, arranged one under the other between an extension of the lines or perforations *c*, in which are boldly printed or delineated in numerals and letters consecutive amounts of dollars corresponding to the dollar-numerals in the spaces *b* to the left of them, and on the left-hand side of these spaces *g* and within them are a series of small figures ranging from 0 to 7 in a downward direction, as shown at *h*.

To the right-hand again of the spaces *g* is a portion *k*, crossed by the extension of the longitudinal lines or perforations *c*, and by a repetition of the transverse lines to form or express a table of odd cents ranging from 1 to 4, and so marked with numerals running from right to left on each line *c* between the cross-lines *d* in said portion *k*.

Supposing the amount of fare paid by the passenger to be three dollars and sixty-two cents, though of course it might be any other, then the conductor, before serving the ticket, punches out, as at *s*, the figure 2 in the portion *k*, which is on the same line *c* as separates the longitudinal rows of dollar numerals or units 3 and 4 on the ticket. He then cuts, tears, or otherwise divides said ticket along said line *c* till it reaches the transverse line or row of perforations *d*, that divides the sixty cents from the sixty-five cents in the spaces *f*, and further cuts, tears, or divides the ticket from said line *c* along said transverse line *d* to and through the upper edge of the ticket. This leaves the cash-fare-receipt portion B of the ticket to be given the passenger, detached and expressing boldly upon the face of it in numerals and letters the amount of three dollars and sixty cents, with an additional indication of two cents, making in all three dollars and sixty-two cents as the amount paid by him, while the check portion A of the ticket clearly indicates by the lines of its separation from the passenger's fare-receipt B and the punch-hole *s* that the same amount has been received by the conductors. If more convenient to conductor, he may begin the separating of the ticket with "cents" and conclude with the dollars.

The small numerals in the cent-spaces *e* and the small numerals *h* to the left of the dollar-indications in the spaces *g* are mainly for the auditor's assistance in checking rates rapidly and accurately.

The figures in the spaces *b* between the rows of perforations *c* and *d* are for the conductor's use to guide him in tearing the ticket as required and to expedite such execution of it.

Along the one or lower marginal portion *l* of the ticket are printed rows or divisions indicating stations, dates, and directions in travel of the train, as usual in other cash-fare tickets, and which the conductor punches as required. For small lines of road, however, where all the stations can be included in full on the ticket, the form for this portion of the ticket may be as represented in Fig. 2, in which a longitudinal line is drawn through the names of the stations crosswise of them to enable the conductor to punch through the names of the stations above said line for east-bound trains or one direction of travel and below said line for west-bound trains or opposite direction of travel.

By the construction of the ticket as hereinbefore described the conductor cannot fraudulently manipulate or alter the check portion of the ticket except to his own disadvantage and loss. As compared with other forms of cash-fare receipts, both the duplex form and others, it has many advantages, especially over those which are simply torn once in direction of the length of the ticket, also those which are torn in three different directions in order to divide them, my ticket having only to be separated in two directions at right angles with each other, which expedites the separation and leaves the part to be retained by the conductor intact and solid, free from all liability of the coupons to drop off, which causes the conductor loss and trouble. The arrangement of the figures, too, in the spaces *e* and *h* for the auditor's use saves labor in computing, and the table of odd cents in the space *k* is a great convenience. The latter arrangement is especially advantageous over other forms which have the odd cents embodied in the main ticket, requiring three punch-marks each time, whether fare is an even or uneven amount, as uneven conductor's fares are not often exacted by railroad companies, and consequently the "odd cents" is seldom used. In such case this ticket is simply separated and handed the passenger. In fine, when it is remembered that the conductor is instructed in every case and in view of the liability to detection in the event of non-compliance, is constrained to give the passenger the correct receipt, the auditor's portion of the ticket must at all times form a perfect check.

Having thus described my invention, I claim as new and desire to secure by Letters Patent—

1. A railway-ticket with a series of longitudinal perforations *c*, extending to its right-hand edge, a series of vertical perforations *d*, extending to the top edge of the ticket, but not to its right-hand edge, the main portion of the ticket where said lines *c d* cross being formed thereby into series of dollar-spaces *b*, each line of which in the direction of the length of the ticket having the same dollar numeral, while vertically said numerals progress successively in value from 1 to 8 or other desired limit, the upper edge of the ticket being formed by the lines $d$ into cent-spaces $f$, and a series of dollar-spaces $g$, formed to the right of the spaces $b$ by the longitudinal perforations $c$, whereby it is only necessary to tear the ticket in two directions to indicate any desired amount, all of the coupons on the line of severance being thus always connected at two or three sides, substantially as set forth.

2. A railway ticket having rows of longitudinal perforations $c$, extending to the right-hand edge of the ticket, and a series of vertical rows of perforations $d$, extending to the upper edge of the ticket, but not to its right-hand edge, the main portion of the ticket where the lines $c\ d$ cross being formed into dollar-spaces $b$, each line of which in the direction of the ticket has the same numeral, while vertically said numerals progress successively from 1 to 8 or other desired limit, the ticket at its right-hand end where divided by the longitudinal rows of perforations only being formed into dollar-spaces $g$ and odd-cents spaces $k$, the numerals in the odd-cents spaces being on the perforated lines $c$ and partly in the spaces above and partly in those below said lines and the cent-spaces $f$ along the upper edge of the ticket between perforations $d$, substantially as set forth.

JAMES D. GIBBS.

Witnesses:
   WALTER IRWIN,
   J. H. McQUIDDY.